(12) United States Patent
Chen et al.

(10) Patent No.: US 9,721,334 B2
(45) Date of Patent: Aug. 1, 2017

(54) WORK-PIECE DEFECT INSPECTION VIA OPTICAL IMAGES AND CT IMAGES

(71) Applicant: International Business Machines Corporation, Armonk, NY (US)

(72) Inventors: Boliang Chen, Shanghai (CN); Min Gong, Shanghai (CN); Dong Sheng Li, Shanghai (CN); Junchi Yan, Shanghai (CN); Chao Zhang, Beijing (CN); Wei Peng Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 14/957,662

(22) Filed: Dec. 3, 2015

(65) Prior Publication Data

US 2017/0161884 A1    Jun. 8, 2017

(51) Int. Cl.
*G06T 7/00* (2017.01)
*G06K 9/62* (2006.01)
*H04N 5/232* (2006.01)

(52) U.S. Cl.
CPC .......... *G06T 7/0004* (2013.01); *G06K 9/6215* (2013.01); *G06K 9/6256* (2013.01); *H04N 5/23245* (2013.01); *G06T 2207/10081* (2013.01); *G06T 2207/30164* (2013.01)

(58) Field of Classification Search
CPC ........ G06T 7/00–7/001; G06K 9/6215; G06K 9/6256; H04N 5/23245
See application file for complete search history.

(56) References Cited

U.S. PATENT DOCUMENTS

| | | |
|---|---|---|
| 6,959,108 B1 | 10/2005 | Bartelt et al. |
| 8,103,085 B1 | 1/2012 | Zadeh |
| 8,442,301 B2 | 5/2013 | Dragovich et al. |
| 8,723,946 B2 | 5/2014 | Takahashi et al. |
| 9,052,294 B2 | 6/2015 | Walton |

(Continued)

OTHER PUBLICATIONS

Yang et al., "Realistic simulation of camera images of local surface defects in the context of multi-sensor inspection systems", Proc. of SPIE, vol. 9525, 2015, 6 pages.

(Continued)

*Primary Examiner* — Sean Motsinger
(74) *Attorney, Agent, or Firm* — L. Jeffrey Kelly

(57) ABSTRACT

A computer-implemented method, computer program product, and system for detecting work-piece defects. The computer-implemented method may include: receiving a first image of a training work-piece captured using a non-destructive imaging process and a second image of the training work-piece captured using a destructive imaging process; receiving an image of a work-piece captured using a non-destructive imaging process, wherein the work-piece is substantially similar to the training work-piece, and the non-destructive imaging process used to capture the work-piece is substantially similar to the non-destructive imaging process used to capture the training work-piece; matching the image of the work-piece to the first image of the training work-piece; and enhancing the image of the work-piece using the second image of the training work-piece, in response to the image of the work-piece matching the first image of the training work-piece.

20 Claims, 13 Drawing Sheets

(56) References Cited

U.S. PATENT DOCUMENTS

| | | | | |
|---|---|---|---|---|
| 2004/0234032 | A1* | 11/2004 | Nokita | G01T 1/2928 378/98.8 |
| 2007/0146707 | A1 | 6/2007 | Matsumura | |
| 2014/0056507 | A1 | 2/2014 | Doyle et al. | |
| 2015/0235357 | A1* | 8/2015 | Nagashima | G01N 23/043 382/141 |
| 2015/0243568 | A1* | 8/2015 | Fischer | H01L 22/26 438/8 |
| 2016/0203594 | A1* | 7/2016 | Morard | G01N 23/046 378/4 |
| 2016/0335756 | A1* | 11/2016 | O'Connor | G06T 7/0004 |
| 2017/0061598 | A1* | 3/2017 | Nagashima | G01N 23/04 |

OTHER PUBLICATIONS

Silva, "X-Ray Computed Tomography Applied as a Comprehensive Technique for Material Analysis and Dimensional Measurement of Metallic Parts", Abstract, Key Engineering Materials, vol. 613, Chapter 9: Management of Measurement Processes, pp. 335-343, Online since May 2014.

Mell et al., "The NIST Definition of Cloud Computing", Recommendations of the National Institute of Standards and Technology, Special Publication 800-145, Sep. 2011, 7 pages.

* cited by examiner

WORK-PIECE DEFECT INSPECTION VIA OPTICAL IMAGES AND CT IMAGES

BACKGROUND

The present invention generally relates to material defect inspection methods and systems, and more particularly to creating a trained data model for enhancing and enlarging low resolution images.

The non-intrusive method of obtaining information on the attenuation of objects inside a body by the use of an X-ray beam, commonly referred to as CT (Computer Tomography), has been well developed, particularly in the medical field. In the past, CT has been applied to fan beam geometry in a 2-D plane. That is, by measuring the attenuation of x-rays through a 2-D object with a source-detector assembly which rotates in the plane of the object about an axis in the perpendicular direction to that plane, it is possible to reconstruct an image of that object.

Another inspection method includes an optical system that uses light reflection to detect surface defects. The modern optical microscope has been improved to provide higher resolution than a CT scan, however, the optical microscope only provides surface data and if internal defects are present a destructive method will need to be used to expose an inner surface having the defect.

SUMMARY

Embodiments of the present invention disclose a computer-implemented method, computer program product, and system for detecting work-piece defects are provided.

According to one embodiment of the present invention, a computer-implemented method for detecting work-piece defects is provided. The computer-implemented method may include: receiving a first image of a training work-piece captured using a non-destructive imaging process; receiving a second image of the training work-piece captured using a destructive imaging process, wherein the second image of the training work-piece covers at least one area in common with the first image of the training work-piece, and the second image of the training work-piece is linked to the first image of the training work-piece by a training model application; receiving an image of a work-piece captured using a non-destructive imaging process, wherein the work-piece is substantially similar to the training work-piece, and the non-destructive imaging process used to capture the work-piece is substantially similar to the non-destructive imaging process used to capture the training work-piece; matching the image of the work-piece to the first image of the training work-piece; and enhancing the image of the work-piece using the second image of the training work-piece linked to the first image of the training work-piece, in response to the image of the work-piece matching the first image of the training work-piece.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
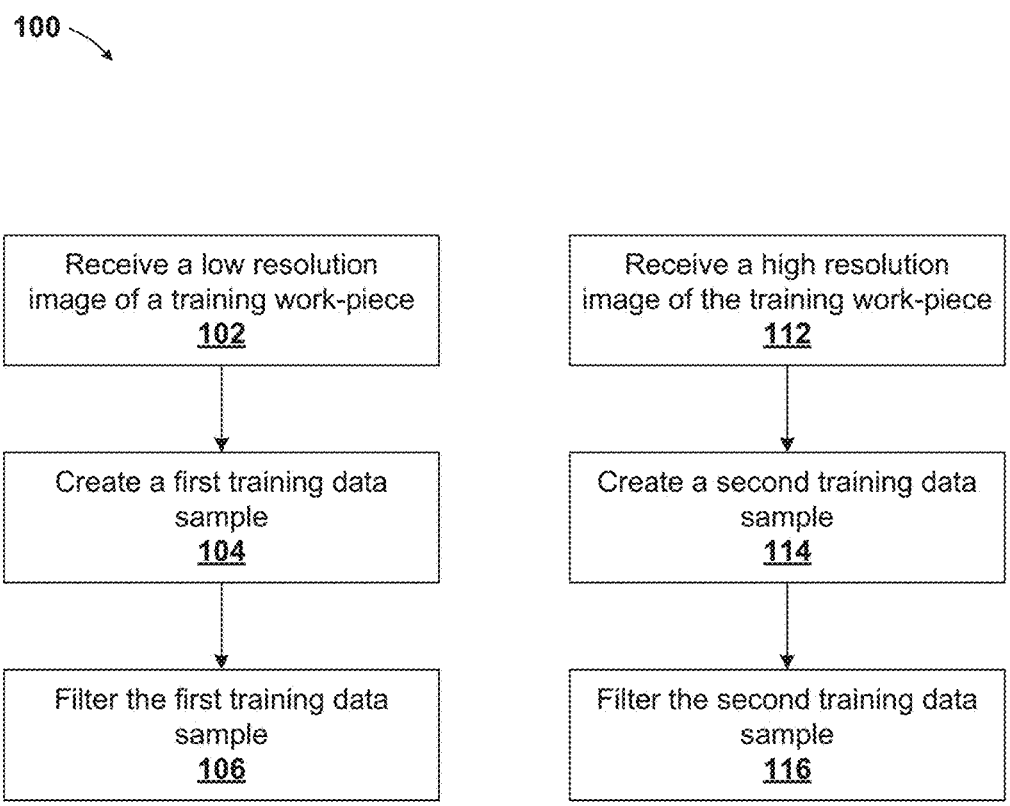
FIG. 1 is an operation flow chart for a training model, according to an exemplary embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention generally relates to material defect inspection methods and systems, and more particularly to creating a trained data model for enhancing and enlarging low resolution images. Ideally, it may be desirable to accurately detect a work-piece defect without using a destructive measurement technique (e.g., a cut and optical imaging process). One way to accurately detect a work-piece defect without the use of a destructive measurement technique is to utilize a highly accurate measuring technique (e.g., destructive technique) and a less accurate measuring technique (e.g., non-destructive) to form a trained data model from a training work-piece. One embodiment by which to accurately detect a work-piece defect without the use of a destructive measurement technique is described in detail below referring to the accompanying drawings FIGS. 1-13.

With reference to FIG. 1, an operational flow chart 100 illustrating steps for creating a training model is provided, according to an embodiment. More specifically, the training model can include filtered data samples from a low resolution and a high resolution image of a training work-piece or a work-piece defect.

Work-piece defects can be detected using a variety of different imaging techniques, some of which may be non-destructive while others may be destructive. An example of a non-destructive imaging technique includes the use of x-ray or computer tomography (CT) imaging. X-ray and CT imaging is non-destructive because defects inside the work-piece can be imaged without destroying or altering the work-piece. An example of a destructive imaging technique includes a cut and optical imaging process that requires the removal of surface material to expose an inner surface of the work-piece.

Typically, x-ray's are a two dimensional representations of a work-piece that passes through a detector. Interpretation of x-ray images can be difficult due to the lack of depth information (i.e., 3D information). Computer tomography (CT) can recreate a 3D image of a work-piece by rotating the work-piece to collect and merge multiple 2D images. From the CT views, an automatic imaging algorithm process can normalize CT pixel value data to produce statistics that detect defects within the sample work-piece, as well as quantify defects within the sample work-piece. This non-destructive imaging process may produce lower resolution images than a destructive imaging process (e.g., optical imaging).

Optical imaging may require the removal of an outer portion of a work-piece to expose an inner surface containing the work-piece defect. Optical imaging can provide an image with higher resolution than a CT scanned image, however, the work-piece must be destroyed or altered to capture the image of the work-piece defect on the inner surface.

To create the training model, a low resolution image of a training work-piece (Step 102) and a high resolution image of the training work-piece (Step 112) are received. In an embodiment, the low resolution image of the training work-piece is captured using a CT scanning process and the high resolution image of the training work-piece is captured using a cut and optical imaging process. It should be noted, the low resolution and high resolution images are both images of the same training work-piece and training work-piece defect. The high resolution image of the training work-piece may be referred to as a linked image or correlating image to the low resolution image of the training work-piece.

A first training data sample and a second training data sample can be obtained and/or created by the training model from the low resolution image (Step 104) and the high resolution image (Step 114), respectively. The training data samples can be pixel grids populated with pixel values. An imaging routine, as is known in the art, can be used to locate a defect and eliminate background noise and fixturing that does not need to be evaluated. This step may include the use of a threshold or band-pass filter to eliminate background noise and fixturing values.

A first filtered training data sample and a second filtered training data sample can be obtained and/or created by the training model from the first training data sample (Step 106) and the second training data sample (Step 116), respectively. In an embodiment, the same filter is used to create the first filtered training data sample and the second filtered training data sample.

Once the second filtered training data sample is created, an optional enhanced filter can be created that would return the same values as the second filtered training data sample if applied to the first training data sample and/or the first filtered training data sample. This might be a quick way to enhance the low resolution image to have the same resolution (i.e., pixel values) as the high resolution image of the training work-piece.

The steps described with reference to FIG. 1 may be performed to populate a training reference bank. The training reference bank can include training images/data samples of one or more training work-pieces. The steps may be referred to as learning steps for the training model because a link can be created between a low resolution image/data sample and a high resolution image/data sample of the same training work-piece. The training model can determine what a low resolution image/data sample should look like if the training model has a matching image or data sample of a training work-piece and the training work-piece has a linked high resolution image/data sample stored in the reference bank. The application of the training model is discussed further in reference to FIG. 2.

Figure 2:
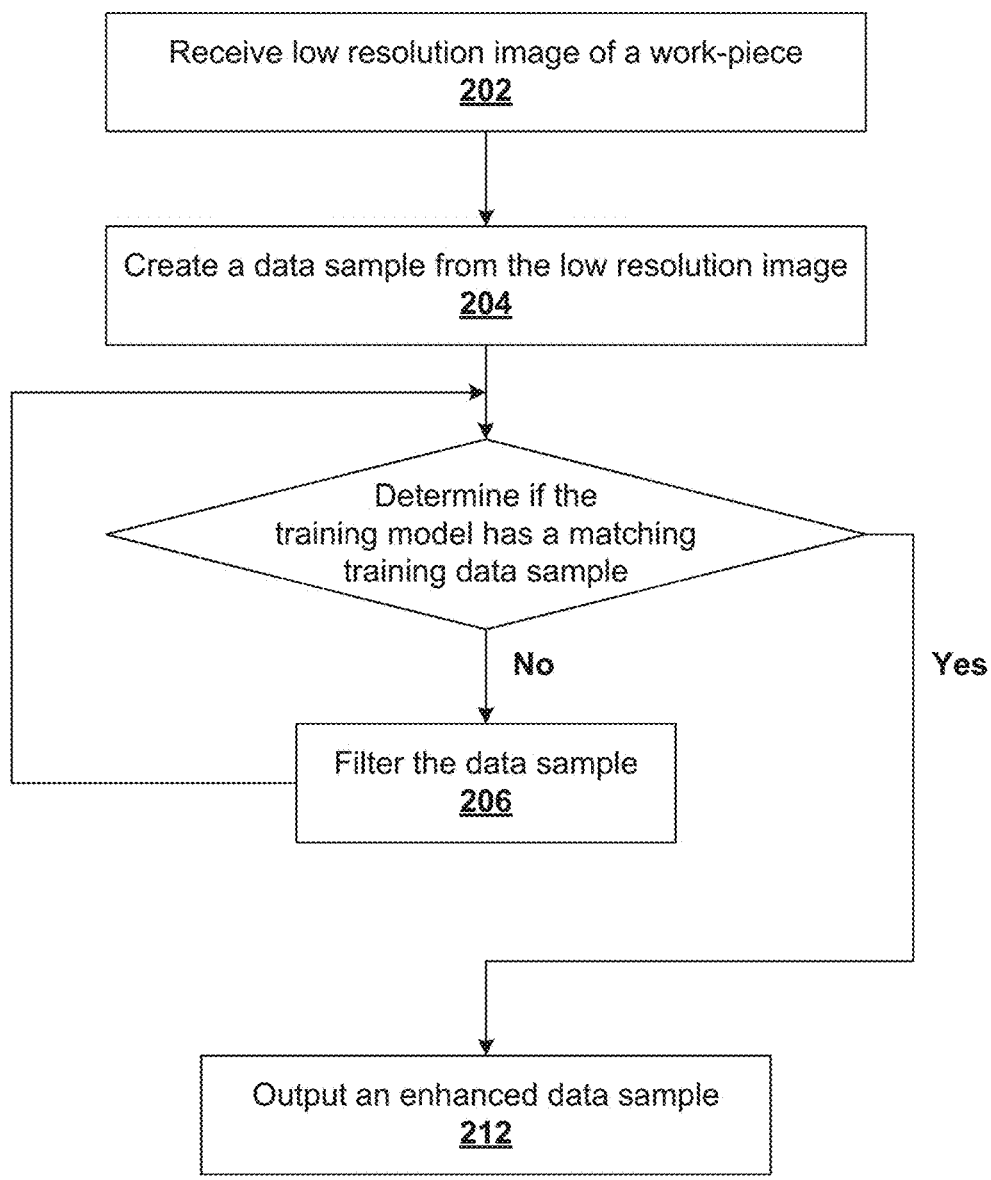
FIG. 2 is an operation flow chart for an application of the training model, according to an exemplary embodiment.

With reference to FIG. 2, an operational flow chart 200 illustrating the steps for applying the training model is provided, according to an embodiment. More specifically, the training model can be trained with training work-pieces (by the steps described with reference to FIG. 1) and apply the images and data samples stored in the reference bank to new work-piece inputs.

The application of the training model can start with receiving a low resolution image of a work-piece (Step 202). The work-piece should be similar to the training work-piece and have similar defects. The low resolution image of the work-piece should be captured using the same imaging process as the low resolution image of the training work-piece. In an embodiment, the low resolution image of the work-piece is captured using a CT scanning process (i.e., non-destructive). A data sample may be created from the low resolution image of the work-piece (Step 204). The data sample may be a populated pixel grid having pixel values in each grid position. An optional check can be performed by the training model, for example, the training model can determine if the data sample matches a training data sample stored in the reference bank. If there is a match, the training model can return either the high resolution image or data sample of the matching training work-piece, or an enhanced data sample of the work-piece. If no match is found, a filter can be applied to the data sample to create a filtered data sample (Step 206). The filter applied to the data sample is the same filter applied to the first training data sample and the second training data sample discussed with reference to FIG. 1. Next, the training model can determine if the filtered data sample matches a filtered training data sample stored in the reference bank. If there is a match, the training model can return either the high resolution image or data sample of the matching training work-piece, or an enhanced data sample of the work-piece (Step 212). If no match is found, another iteration of filtering can be performed.

Figure 3:
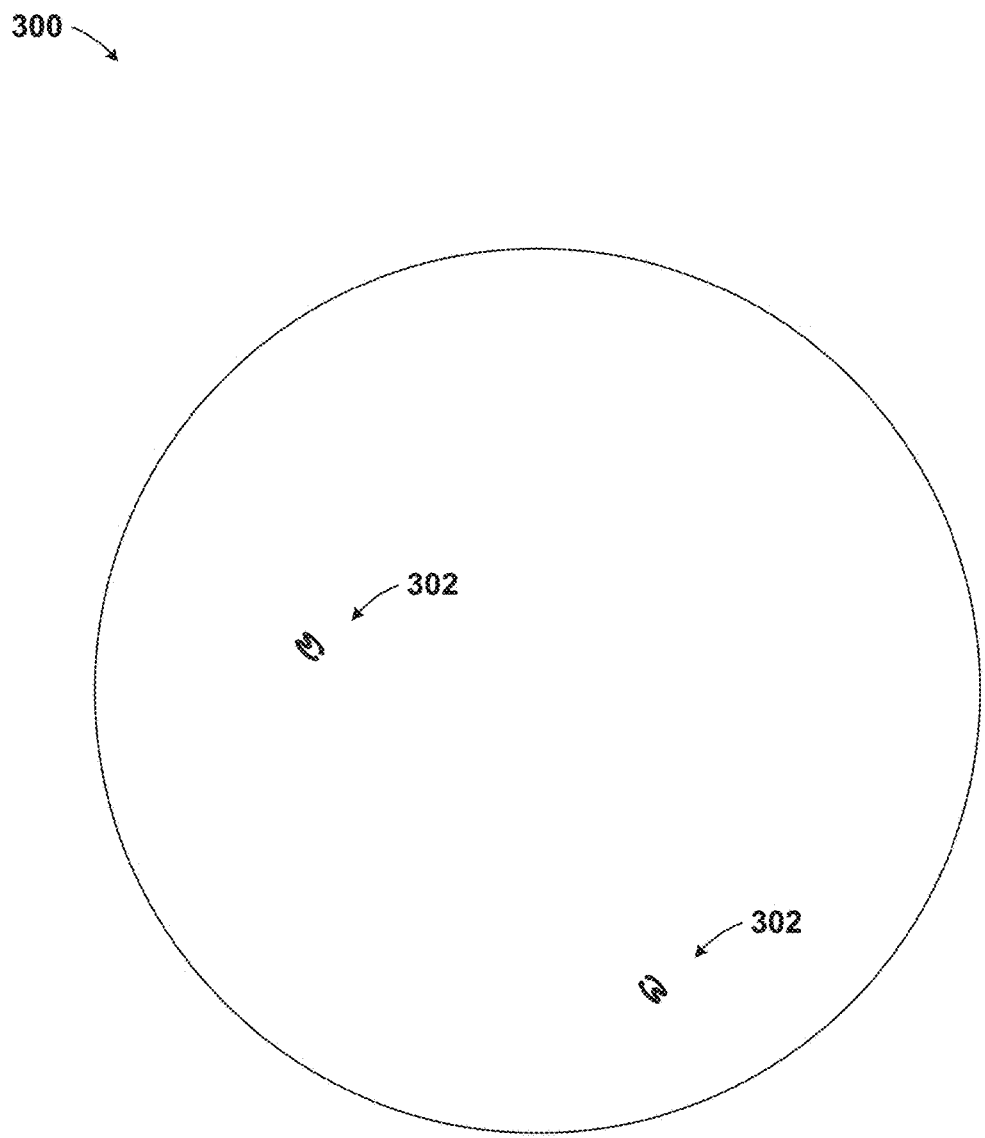
FIG. 3 is an illustration of a work-piece having work-piece defects, according to an exemplary embodiment.

With reference to FIG. 3, an exemplary illustration of a training wafer 300 (i.e., training work-piece) is provided, according to an embodiment. More specifically, the training wafer 300 includes training work-piece defect 302 on an inner surface of the training wafer 300. The training work-piece defect 302 and the method of obtaining the first and second training data samples and the first and second filtered training data samples is discussed further with reference to FIGS. 4-9.

Figure 4:
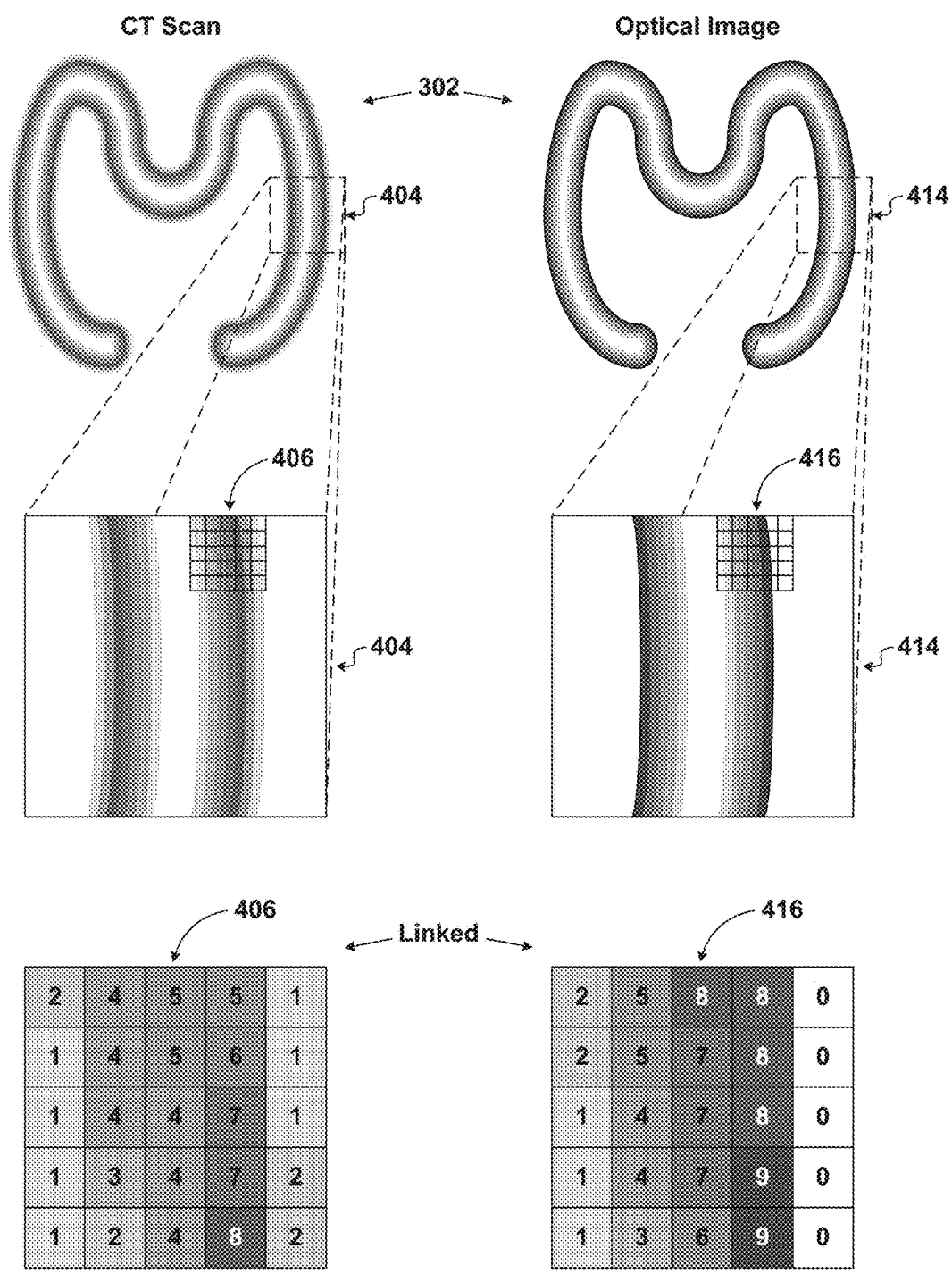
FIG. 4 is an illustration of a pixel graph representing the work-piece defect, according to an exemplary embodiment.

With reference to FIG. 4, an exemplary illustration of the training work-piece defect 302 is provided, according to an embodiment. More specifically, the variation in the low resolution image and the high resolution image of the training work-piece defect 302 is illustrated and discussed.

A low resolution image of the training work-piece defect 302 is illustrated on the top-left of FIG. 4. In an embodiment, the low resolution image is captured via a CT scanning process. A high resolution image of the training work-piece defect 302 is illustrated on the top-right of FIG. 4. In an embodiment, the high resolution image is captured via a cut and optical imaging process. The low resolution image may be slightly distorted because of resolution limitations, such that defect boundary lines are blurred and not easily located while the high resolution image can depict clear boundary lines.

A first sample 404 is taken from the low resolution image of the training work-piece defect 302 and a second sample 414 is taken from the high resolution image of the training work-piece defect 302 for illustrative purposes. The first sample 404 can include a first pixel grid 406 and the second sample 414 can include a second pixel grid 416. The first sample 404 and the first pixel grid 406 are taken from the same location of the training work-piece defect 302 as the second sample 414 and the second pixel grid 416, respectively. The second pixel grid 416 can be linked to the first pixel grid 406 and may be referred to as a corresponding or linked pixel grid.

As discussed above, the pixel grids may have populated pixel values (illustrated on the bottom-left and bottom-right of the figure). The values can represent any pixel values known in the art, such as, for example, color, contrast, or any other known pixel values. In an embodiment, the pixel values range from 0-10 and can represent the probability of a defect boundary line within each pixel location (e.g., taken from the color or contrast of the image at each pixel location).

Figure 5:
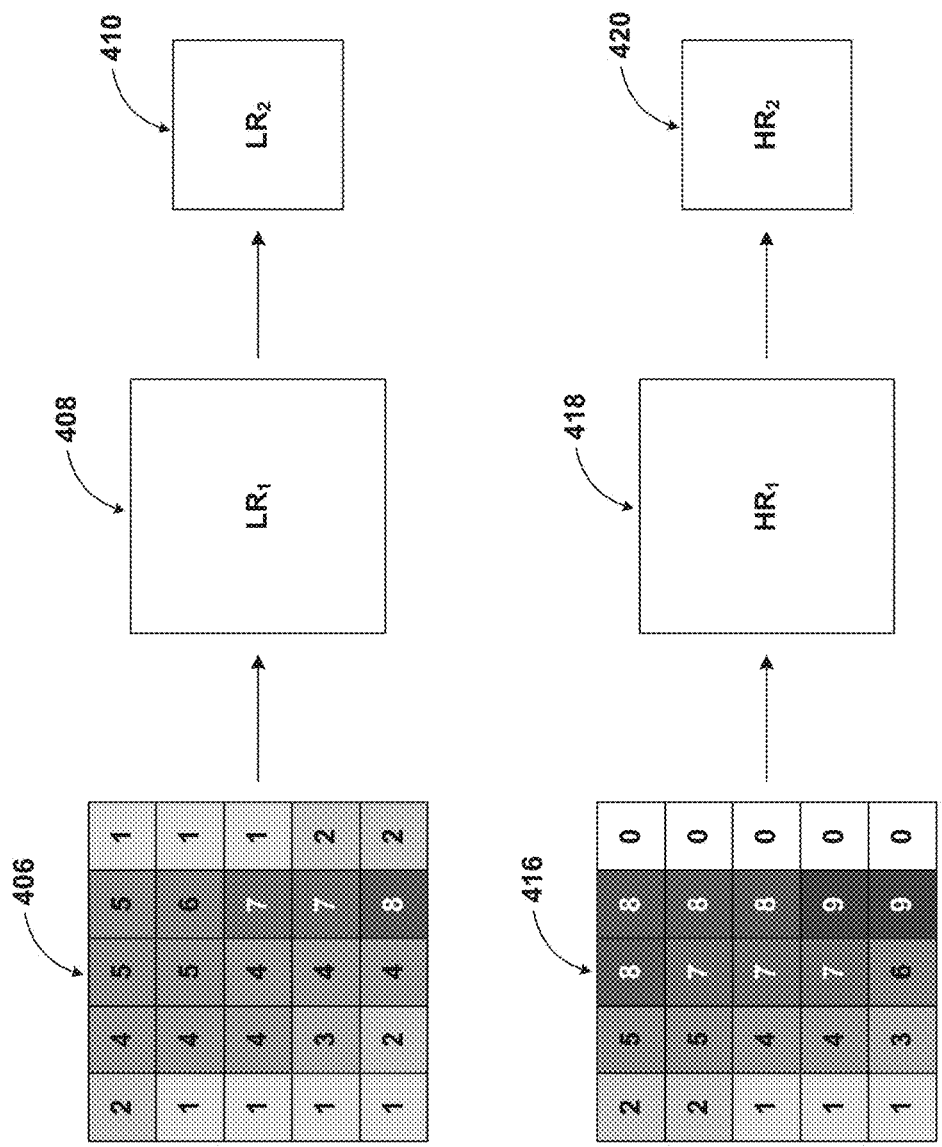
FIG. 5 is an illustration of a filtered pixel grid representing the work-piece defect, according to an exemplary embodiment.

With reference to FIG. 5, an exemplary illustration of filtering steps is provided, according to an embodiment. More specifically, a filter can be applied to the first pixel grid 406 and the second pixel grid 416 to create a first low resolution filtered pixel grid ($LR_1$) 408 and a first high resolution filtered pixel grid ($HR_1$) 418, respectively. In an embodiment, a second filter can be applied to the ($LR_1$) 408 and the ($HR_1$) 418 creating a second low resolution filtered pixel grid ($LR_2$) 410 and a second high resolution filtered pixel grid ($HR_2$) 420, respectively. Any number of filtering iterations may be performed depending on, for example, design requirements or imaging variations. Each filter may reduce the size of the pixel grid being filtered, as is known in the art. A few exemplary filtering techniques are discussed further with reference to FIGS. 6 and 7.

Figure 6:
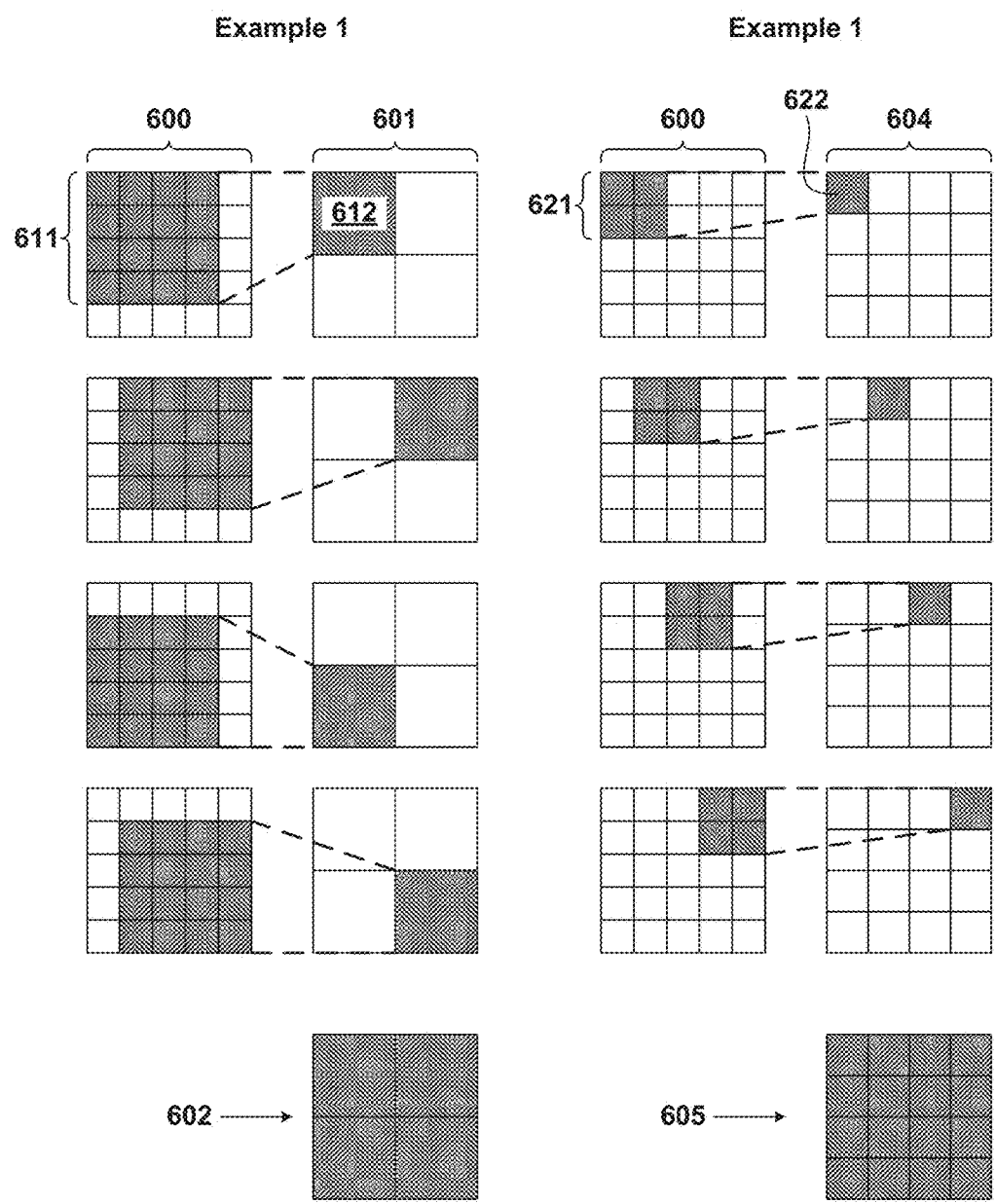
FIG. 6 is an illustration of filtering examples, according to an exemplary embodiment.

With reference to FIG. 6, an exemplary illustration of two possible filtering processes is provided, according to an embodiment. More specifically, the application of each filtering process is applied to a data sample pixel grid to illustrate a resulting filtered pixel grid.

Example 1 is a 4×4 pixel filter 611 applied to a 5×5 data sample 600. The filter 611 may calculate any known filtering values known in the art, returning, for example, a max, a median, a mean, and/or an average pixel value at each filtering location. The filter 611 can populate a 2×2 filtered pixel grid 601; such that when the filter 611 is applied to the top-left 4×4 pixel grid of data sample 600, a filtered pixel value 612 is calculated and entered into the top-left pixel location of the filtered pixel grid 601. The filter 611 can be moved across the data sample 600 at any interval, for example, one pixel per filtering calculation. In an embodiment, the filter 611 can filter the top-right, bottom-left, and bottom-right 4×4 pixel grids of data sample 600 resulting in a fully populated 2×2 filtered pixel grid 602.

Example 2 is a 2×2 pixel filter 621 applied to the 5×5 data sample 600. The filter 621 may calculate any known filtering values known in the art, returning, for example, a max, a median, a mean, and/or an average pixel value at each filtering location. The filter 621 can populate a 4×4 filtered pixel grid 604; such that when the filter 621 is applied to the top-left 2×2 pixel grid of data sample 600, a filtered pixel value 622 is calculated and entered into the top-left pixel location of the filtered pixel grid 604.

The filter 621 can be moved across the data sample 600 at any interval, for example, one pixel per filtering calculation. In an embodiment, the filter 621 can populate a top row of the filtered pixel grid 604 by moving one pixel at a time across the top row of 2×2 pixel grids of data sample 600. The second, third, and forth row of the filtered pixel grid 604 can be populated by moving the filter 621 down one pixel at a time and filtered across each row of 2×2 pixel grids of data sample 600 resulting in a fully populated 4×4 filtered pixel grid 605.

Figure 7:
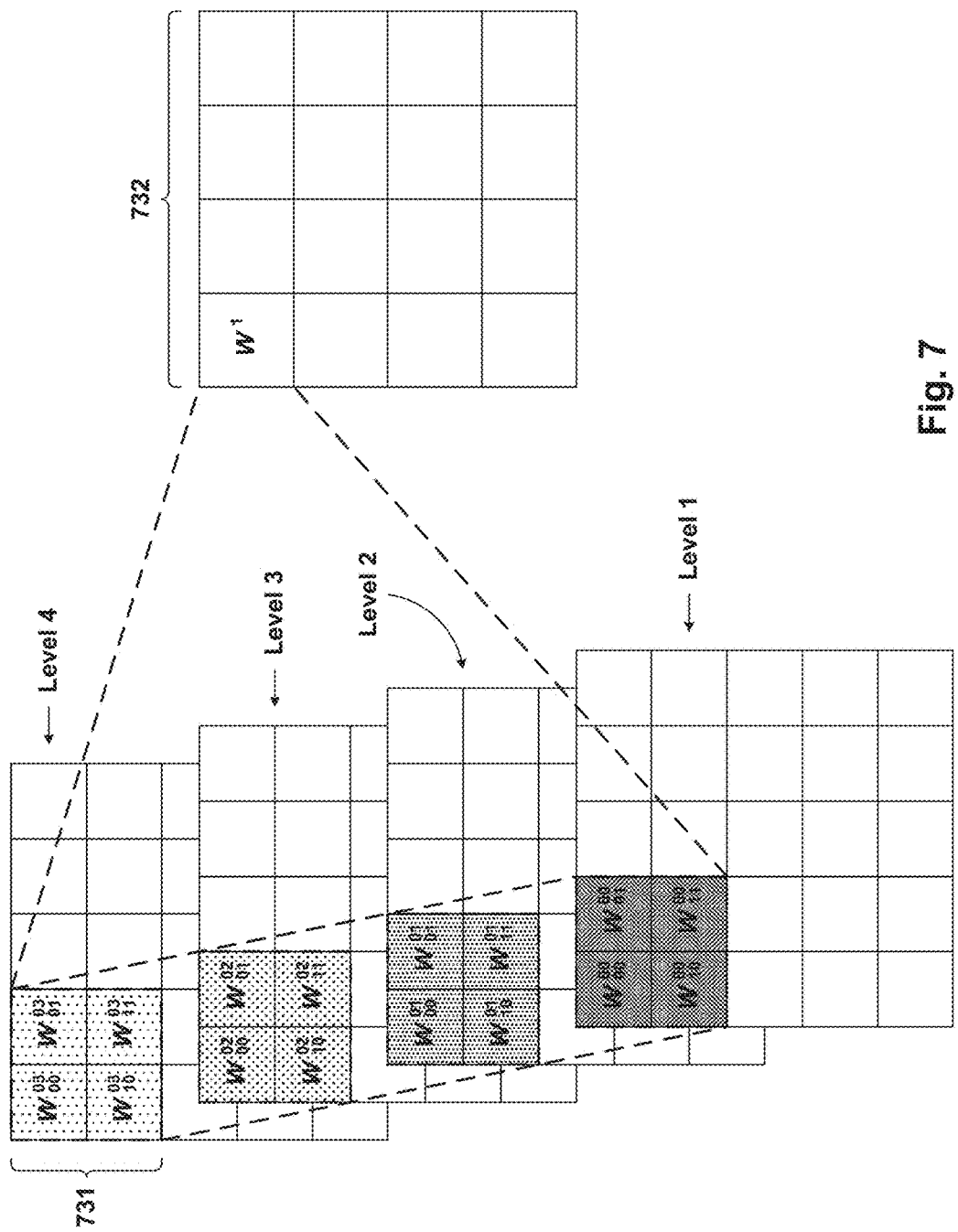
FIG. 7 is an illustration of a filtering example having multiple filtering levels, according to an exemplary embodiment.

With reference to FIG. 7, an exemplary illustration of an alternative filtering method is provided, according to an embodiment. More specifically, a 2×2 pixel filter 731 can be applied to a 5×5 data sample on multiple levels (e.g., filtering using different filtering parameters at the same pixel grid location).

Similarly to example 2 described in reference to FIG. 6, a 2×2 pixel filter 731 is used to create a 4×4 filtered pixel grid 732. The pixel filter 731 can be applied to levels 1-4 of the 5×5 data sample. Each level can be filtered for a different value, such as, for example, image line direction, color, and contrast. A filter value w can be used for each layer of the 5×5 data sample, wherein levels 1-4 have filter values of $w_{00}$, $w_{01}$, $w_{10}$, and $w_{11}$, respectively.

Each pixel grid location across levels 1-4 can be computed to populate a single pixel grid value in the filtered pixel grid 732. In an embodiment, the top-left 2×2 pixel grids of levels 1-4 are filtered and computed to populate the top-left pixel of the filtered pixel grid 732 having a value of $w^1$. Similar to example 2 described in reference to FIG. 6, the pixel filter 731 can be moved across the 5×5 data sample one pixel at a time until the filtered pixel grid 732 is fully populated.

Figure 8:
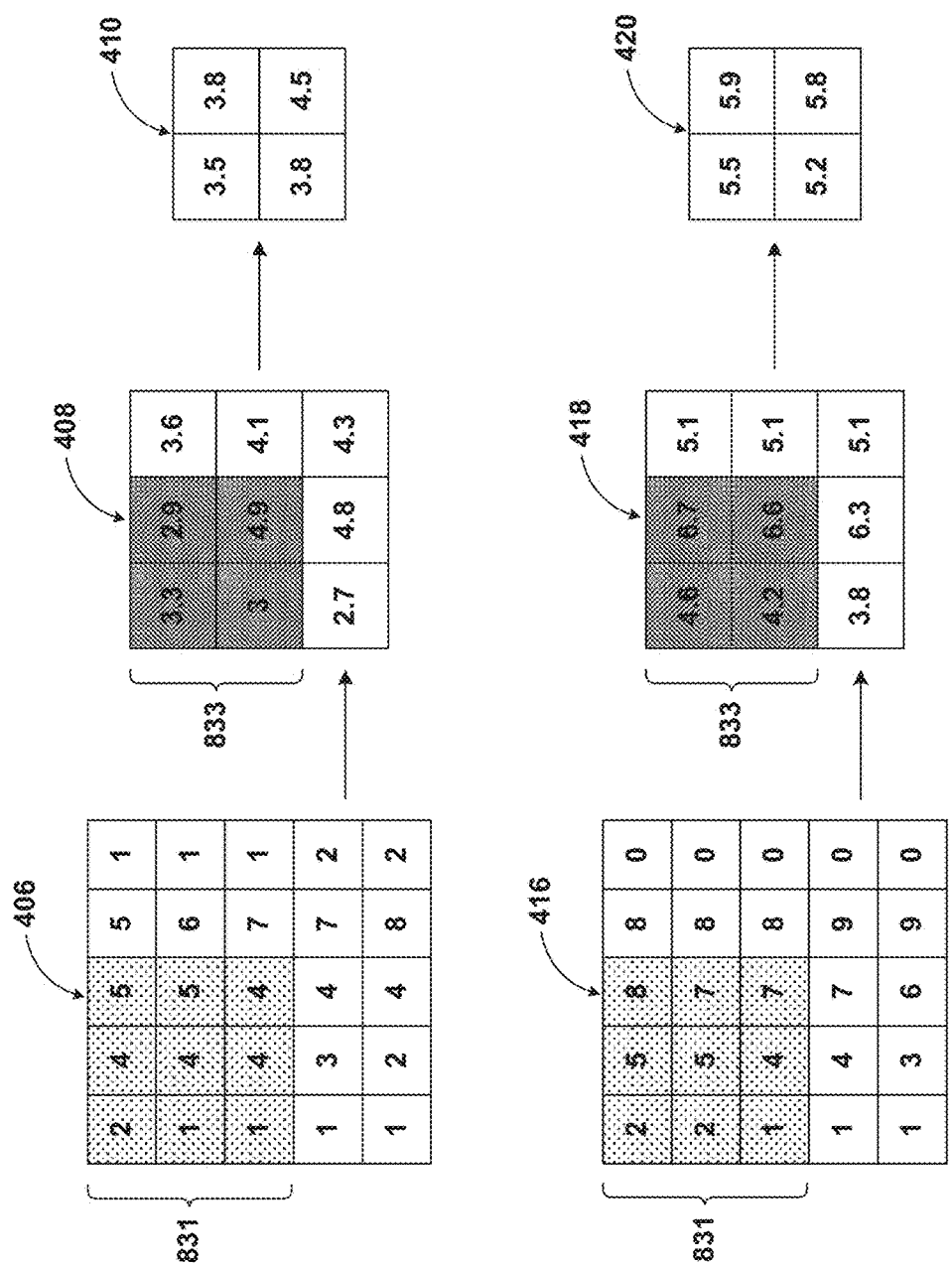
FIG. 8 is an illustration of a filtered pixel grid representing the work-piece defect, according to an exemplary embodiment.

With reference to FIG. 8, an exemplary illustration of a filtering process performed to the first pixel grid 406 and the second pixel grid 416 (described in reference to FIG. 4) is provided, according to an embodiment. More specifically, the population of $(LR_1)$ 408, $(LR_2)$ 410, $(HR_1)$ 418, and $(HR_2)$ 420 (described in reference to FIG. 5) is provided. It should be noted, in the illustrated embodiment, two filtering techniques are applied to the first pixel grid 406 and to the second pixel grid 416, however, any number of filtering techniques and iterations may be performed.

In an embodiment, the first pixel grid 406 and to the second pixel grid 416 are each a 5×5 pixel grid. A 3×3 pixel filter 831 is applied to each 3×3 pixel grid within the first pixel grid 406 and within the second pixel grid 416, such that the resulting filtered pixel grids, $(LR_1)$ 408 and $(HR_1)$ 418, are each a 3×3 pixel grid. In an embodiment, the pixel filter 831 is an averaging filter, such that, the top-left 3×3 pixel grid of the first pixel grid 406 returned a value of 3.3 and the top-left 3×3 pixel grid of the second pixel grid 416 returned a value of 4.6.

In an embodiment, a 2×2 pixel filter 833 is applied to each 2×2 pixel grid within $(LR_1)$ 408 and within $(HR_1)$ 418, such that the resulting filtered pixel grids, $(LR_2)$ 410 and $(HR_2)$ 420, are each a 2×2 pixel grid. In an embodiment, the pixel filter 833 is an averaging filter, such that, the top-left 2×2 pixel grid of $(LR_1)$ 408 returned a value of 3.5 and the top-left 2×2 pixel grid of $(HR_1)$ 418 returned a value of 5.5.

Figure 9:
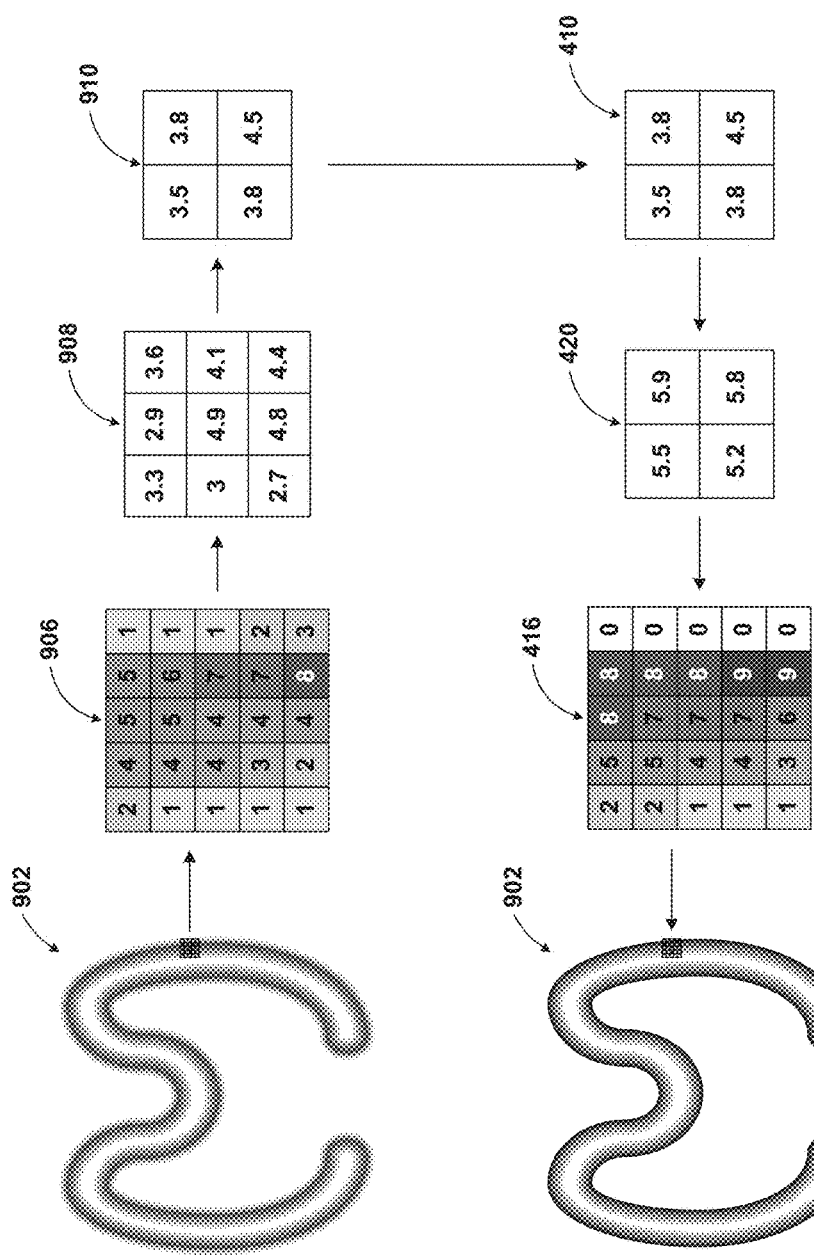
FIG. 9 is an illustration of the application of the training model, according to an exemplary embodiment.

With reference to FIG. 9, an exemplary illustration of a work-piece image input, training model application, and linked output is provided, according to an embodiment. More specifically, after the training model has collected the training images, data samples, and filtered data samples discussed in reference to FIGS. 4-8 the training model can perform the application steps discussed in reference to FIG. 2.

A low resolution image of a work-piece defect 902 is provided to the training model. The work-piece defect 902 can be a defect on a work-piece similar to the training work-piece (e.g., training wafer 300 illustrated in FIG. 3). A data sample of the low resolution image can populate a work-piece pixel grid 906 using the same data population technique used to populate the first pixel grid 406.

The pixel values in the work-piece pixel grid 906 may be the same or similar to the pixel values of the first pixel grid 406. The training model can run a matching application to determine if the pixel values in the work-piece pixel grid 906 matches the pixel values in a training data sample pixel grid. For example, if the pixel values in the work-piece pixel grid 906 are the same as the pixel values of the first pixel grid 406, the training model can output the pixel values of a corresponding or linked high resolution pixel grid (e.g., the second pixel grid 416). In an alternative embodiment, if the pixel values are matched to a training data sample pixel grid, the training model can apply an enhanced filter to return enhanced pixel values (e.g., the pixel values of the second pixel grid 416).

In the illustrated embodiment, the bottom-right pixel value of the work-piece pixel grid 906 is 3 and the bottom-right pixel value of the first pixel grid 406 is 2. The training model can either learn or determine (depending on design and accuracy requirements) that the work-piece pixel grid 906 is representing the same defect as the first pixel grid 406 and proceed as if the pixel grids matched; alternatively, the training model can perform a first filter to the work-piece pixel grid 906.

A first filtered pixel grid 908 may be created by running the first filter through the work-piece pixel grid 906. The first filter should be the same as the filter used to create the filtered training pixel grid (e.g., $(LR_1)$ 408). In the illustrated embodiment, the filter used to create $(LR_1)$ 408 was a 3×3 filter and created a 3×3 filtered pixel grid, such that the first filtered pixel grid 908 will also be a 3×3 pixel grid. The training model can run the matching application again to determine if the first filtered pixel grid 908 matches a filtered training pixel grid. For example, if the pixel values in the first filtered pixel grid 908 are the same as the pixel values of $(LR_1)$ 408, the training model can output the pixel values of a corresponding or linked high resolution pixel grid (e.g., the second pixel grid 416). In the illustrated embodiment, the bottom-right pixel value of the first filtered pixel grid 908 is 4.4 and the bottom-right pixel value of $(HR_2)$ 420 is 4.3. The training model can either learn or determine that the first filtered pixel grid 908 is representing the same filtered work-piece defect as $(HR_2)$ 420 and proceed as if the pixel grids matched; or the training model can perform a second filter to the first filtered pixel grid 908.

A second filtered pixel grid 910 may be created by running the second filter through the first filtered pixel grid 908. The second filter should be the same as the filter used to create the second filtered training pixel grid (e.g., $(LR_2)$ 410). In the illustrated embodiment, the filter used to create $(LR_2)$ 410 was a 2×2 filter and created a 2×2 filtered pixel grid, such that the second filtered pixel grid 910 will also be a 2×2 pixel grid. The training model can run the matching application to determine if the second filtered pixel grid 910 matches a second filtered training pixel grid. For example, if the pixel values in the second filtered pixel grid 910 are the same as the pixel values of $(LR_2)$ 410, the training model can output the pixel values of a corresponding or linked high resolution pixel grid (e.g., the second pixel grid 416). In the illustrated embodiment, through filtering (e.g., averaging) the second filtered pixel grid 910 matches a second filtered pixel grid (i.e., $(LR_2)$ 410). However, if no match is found, the training model can continue to filter until a match is found, or until it is determined that the work-piece defect is not the same as any training work-piece defect stored in the reference bank.

In the illustrated embodiment, the second filtered pixel grid 910 matched $(LR_2)$ 410, such that the training model can adjust the work-piece pixel grid 906 to have values matching the corresponding high resolution pixel grid of the second pixel grid 416. The training model can apply the same method for every gird location of the work-piece defect 902. If the work-piece defect is the same as the training work-piece defect 302 (illustrated in FIG. 4), each grid location can be replaced with the linked high resolution pixel grid of the second pixel grid 416 resulting in an enhanced image of the work-piece defect 902.

It should be noted, any known method of linking and extrapolating or interpolating between images, pixel grids, and/or filtered pixel grids may be used. One method may include convolutional neural networks (CNN).

Figure 10:
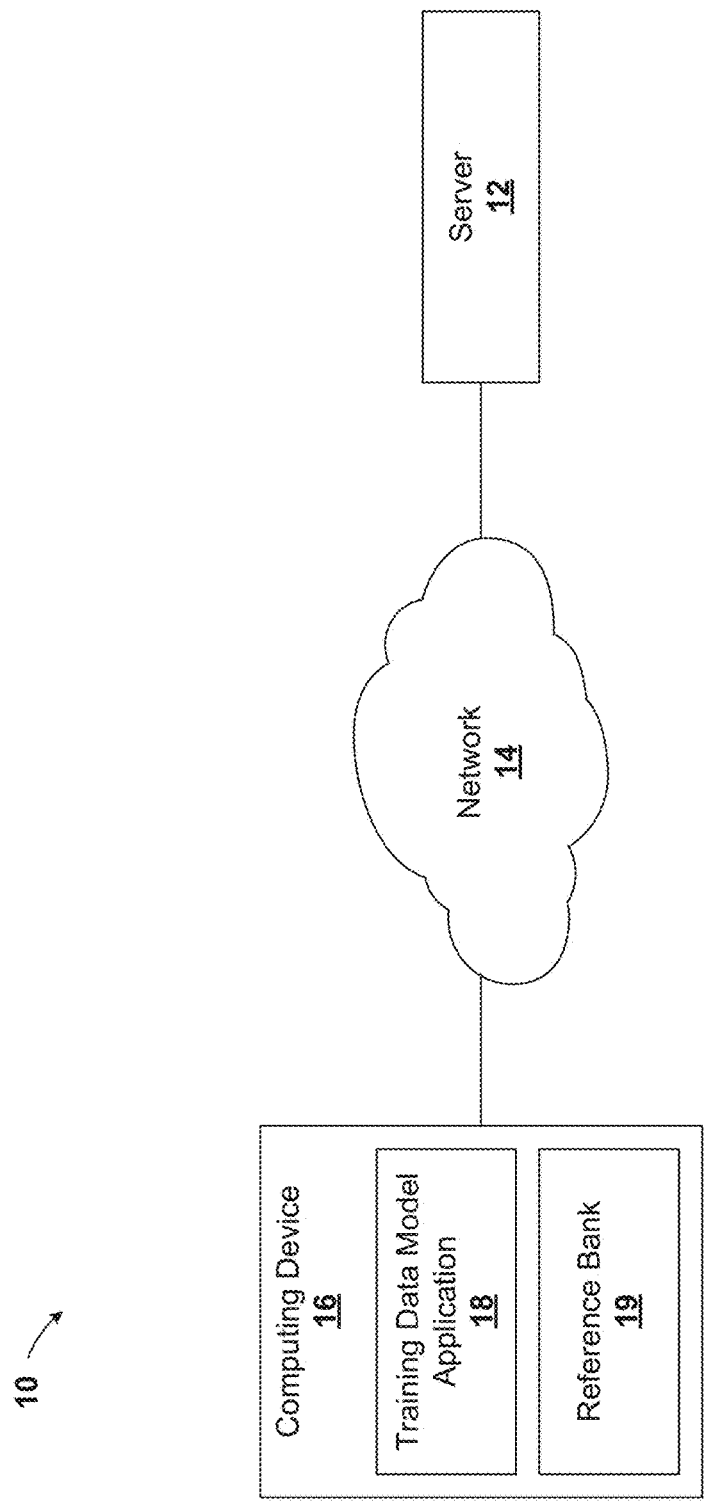
FIG. 10 is an illustration of a networked computer environment, according to an embodiment.

With reference to FIG. 10, an exemplary computer network environment 10 for a training data model application 18 is provided, according to an embodiment. More specifically, the computer network environment 10 may include one or more servers 12 and/or computing devices 16 having the training data model application 18. The computing device 16 can communicate with the server 12 across a communications network 14. The communications network 14 may include connections, such as wire, wireless communication links, or fiber optic cables. The server 12 may be, for example, a desktop computer, a laptop computer, a netbook, a mobile device, or any programmable electronic device capable of communicating with computing device 16 via communications network 14.

The computing device 16 may be, for example, a desktop computer, a laptop computer, a netbook, a mobile device, or any other computing device capable of running the training data model application 18. The computing device 16 can also have a processor and a data storage device that is enabled to run the training data model application 18 and to store training work-piece images and data samples. The training data model application 18 can create and/or receive training work-piece images and data samples to create a trained data model. The trained data model can be used to enlarge low resolution images of a work-piece and work-piece defect that is similar to the training work-piece and training work-piece defect.

Figure 11:
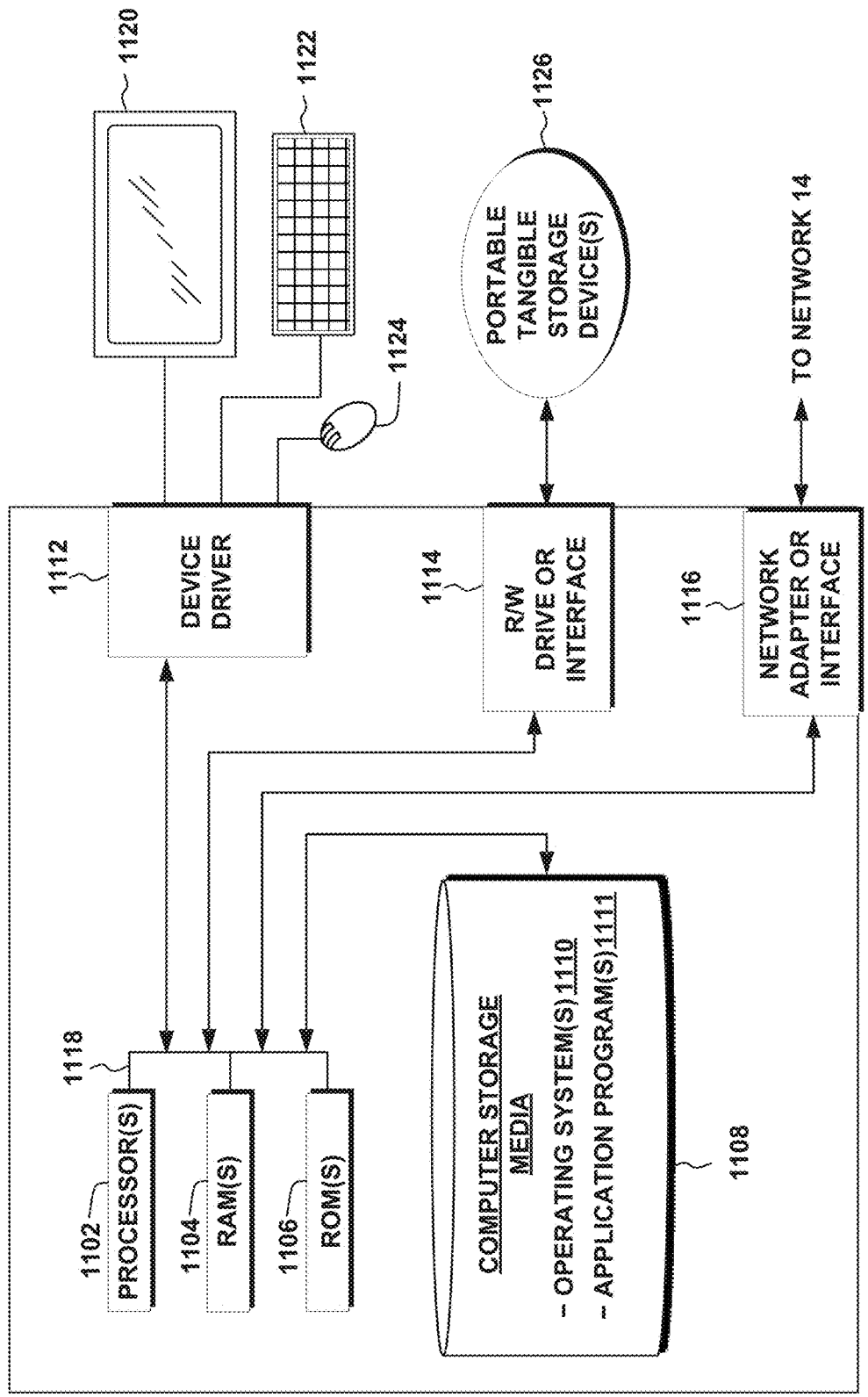
FIG. 11 is a block diagram of internal and external components of a computing device, according to an embodiment.

Referring now to FIG. 11, a block diagram of components of the computing device 16 (described in reference to FIG. 10) is provided, according to an embodiment. It should be appreciated that FIG. 11 provides only an illustration of one implementation and does not imply any limitations with regard to the environments in which different embodiments may be implemented. Many modifications to the depicted environment may be made.

The computing device 16 may include one or more processors 1102, one or more computer-readable RAMs 1104, one or more computer-readable ROMs 1106, one or more computer readable storage media 1108, device drivers 1112, read/write drive or interface 1114, network adapter or interface 1116, all interconnected over a communications fabric 1118. Communications fabric 1118 may be implemented with any architecture designed for passing data and/or control information between processors (such as microprocessors, communications and network processors, etc.), system memory, peripheral devices, and any other hardware components within a system.

One or more operating systems 1110, and one or more application programs 1111, for example, training data model application 18 (described in reference to FIG. 10), may be stored on one or more of the computer readable storage media 1108 for execution by one or more of the processors 1102 via one or more of the respective RAMs 1104 (which typically include cache memory). In the illustrated embodiment, each of the computer readable storage media 1108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device 16 may also include an R/W drive or interface 1114 to read from, and write to, one or more portable computer readable storage media 1126. The training data model application 18 on the computing device 16 may be stored on one or more of the portable computer readable storage media 1126, read via the respective R/W drive or interface 1114 and loaded into the respective computer readable storage media 1108.

The computing device 16 may also include a network adapter or interface 1116, such as a TCP/IP adapter card or wireless communication adapter (such as a 4G wireless communication adapter using OFDMA technology). Application programs 1111 may be downloaded from an external computer or external storage device via a network (for example, the Internet, a local area network or other wide area network or wireless network) and network adapter or interface 1116. From the network adapter or interface 1116, the programs may be loaded onto computer readable storage media 1108. The network may comprise copper wires, optical fibers, wireless transmission, routers, firewalls, switches, gateway computers and/or edge servers.

The computing device 16 may also include a display screen 1120, a keyboard or keypad 1122, and a computer mouse or touchpad 1124. Device drivers 1116 interface to display screen 1120 for imaging, to keyboard or keypad 1122, to computer mouse or touchpad 1124, and/or to display screen 1120 for pressure sensing of alphanumeric character entry and user selections. The device drivers 1112, R/W drive or interface 1114 and network adapter or interface 1116 may comprise hardware and software (stored on computer readable storage media 1108 and/or ROM 1106)

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
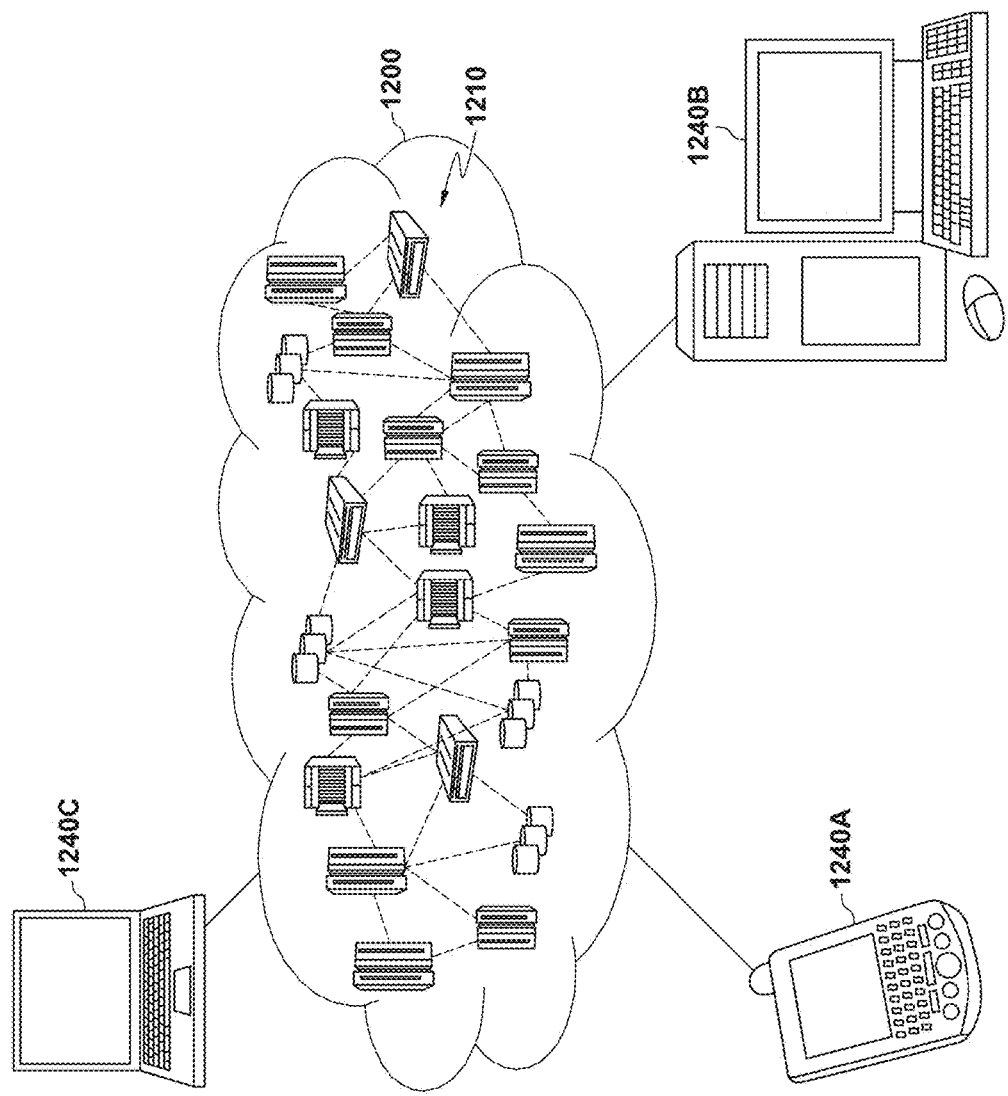
FIG. 12 is an illustration of a cloud computing environment including computing device, according to an embodiment.

Referring now to FIG. 12, an exemplary illustration of a cloud computing environment is depicted. The cloud computing environment can include one or more cloud computing nodes with which local computing devices used by cloud consumers, such as, for example, personal digital assistant (PDA) or cellular telephone 1240A, desktop computer 1240B, and/or laptop computer 1240C may communicate. The nodes may be grouped (not shown) physically or virtually, in one or more networks, such as Private, Community, Public, or Hybrid clouds as described hereinabove, or a combination thereof. This allows the cloud computing environment to offer infrastructure, platforms and/or software as services for which a cloud consumer does not need to maintain resources on a local computing device. It is understood that the types of computing devices 61240A-C are intended to be illustrative only and that computing nodes and the cloud computing environment can communicate with any type of computerized device over any type of network and/or network addressable connection (e.g., using a web browser).

Figure 13:
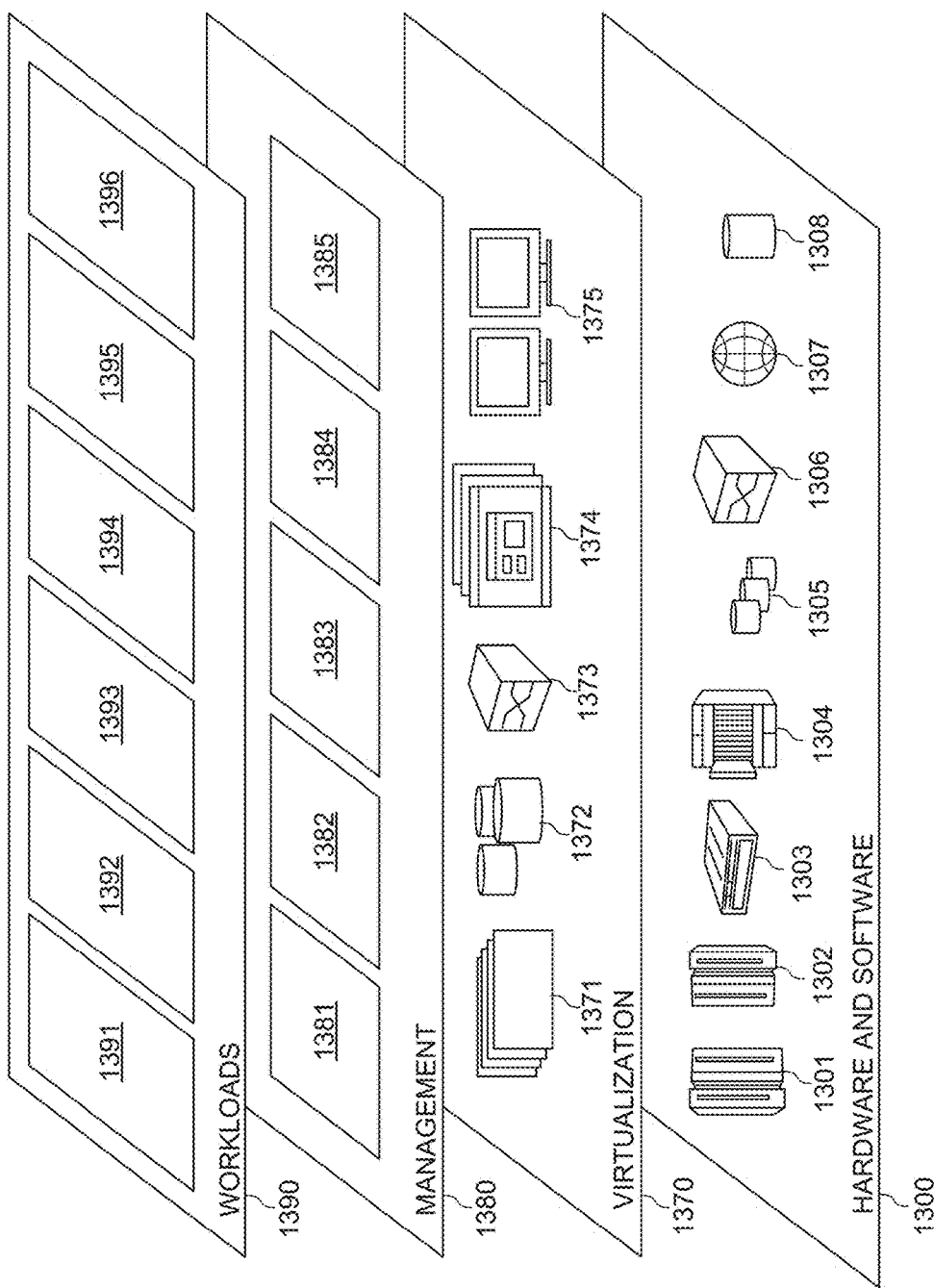
FIG. 13 is a block diagram of functional layers of the illustrated cloud computing environment, according to an embodiment.

Referring now to FIG. 13, a set of functional abstraction layers 700 provided by the cloud computing environment illustrated in FIG. 12 is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1300 includes hardware and software components. Examples of hardware components include: mainframes 1301; RISC (Reduced Instruction Set Computer) architecture based servers 1302; servers 1303; blade servers 1304; storage devices 1305; and networks and networking components 1306. In some embodiments, software components include network application server software 1307 and database software 1308.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and training data model processing 1396.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of detecting work-piece defects comprising:
   receiving a first image of a training work-piece captured using a non-destructive imaging process;
   receiving a second image of the training work-piece captured using a destructive imaging process, wherein the second image of the training work-piece covers at least one area in common with the first image of the training work-piece, and the second image of the training work-piece is linked to the first image of the training work-piece by a training model application;

receiving an image of a work-piece captured using a non-destructive imaging process, wherein the work-piece is substantially similar to the training work-piece, and the non-destructive imaging process used to capture the work-piece is substantially similar to the non-destructive imaging process used to capture the training work-piece;

matching the image of the work-piece to the first image of the training work-piece; and enhancing the image of the work-piece using the second image of the training work-piece linked to the first image of the training work-piece, in response to the image of the work-piece matching the first image of the training work-piece.

2. The computer-implemented method of claim 1, wherein the first image of the training work-piece has a first pixel grid, the second image of the training work-piece has a second pixel grid, and the image of the work-piece has a work-piece pixel grid, and wherein the second pixel grid covers the same area of the training work-piece as the first pixel grid.

3. The computer-implemented method of claim 2, further comprising:

filtering the first pixel grid, the second pixel grid, and the work-piece pixel grid using the same filter, wherein the first pixel grid results in a first filtered pixel grid, the second pixel grid results in a second filtered pixel grid, and the work-piece pixel grid results in a filtered work-piece pixel grid.

4. The computer-implemented method of claim 3, wherein matching the image of the work-piece to the first image of the training work-piece further comprising:

determining if the first pixel grid is the same as the work-piece pixel grid; and determining if the first filtered pixel grid is the same as the filtered work-piece pixel grid, in response to a determination that the first pixel grid is not the same as the work-piece pixel grid.

5. The computer-implemented method of claim 2, wherein enhancing the image of the work-piece using the second image of the training work-piece linked to the first image of the training work-piece includes replacing the work-piece pixel grid with the second pixel grid.

6. The computer-implemented method of claim 1, wherein the non-destructive imaging process is a computer tomography (CT) imaging process and the destructive imaging process includes an optical imaging process.

7. The computer-implemented method of claim 1, wherein the first image of the training work-piece has a lower resolution than the second image of the training work-piece.

8. A computer program product for detecting work-piece defects, the computer program product comprising:

one or more computer-readable storage media and program instructions stored on the one or more computer-readable storage media, the program instructions comprising:

program instructions to receive a first image of a training work-piece captured using a non-destructive imaging process;

program instructions to receive a second image of the training work-piece captured using a destructive imaging process, wherein the second image of the training work-piece covers at least one area in common with the first image of the training work-piece, and the second image of the training work-piece is linked to the first image of the training work-piece by a training model application;

program instructions to receive an image of a work-piece captured using a non-destructive imaging process, wherein the work-piece is substantially similar to the training work-piece, and the non-destructive imaging process used to capture the work-piece is substantially similar to the non-destructive imaging process used to capture the training work-piece;

program instructions to match the image of the work-piece to the first image of the training work-piece; and program instructions to enhance the image of the work-piece using the second image of the training work-piece linked to the first image of the training work-piece, in response to the image of the work-piece matching the first image of the training work-piece.

9. The computer program product of claim 8, wherein the first image of the training work-piece has a first pixel grid, the second image of the training work-piece has a second pixel grid, and the image of the work-piece has a work-piece pixel grid, and wherein the second pixel grid covers the same area of the training work-piece as the first pixel grid.

10. The computer program product of claim 9, further comprising:

program instructions to filter the first pixel grid, the second pixel grid, and the work-piece pixel grid using the same filter, wherein the first pixel grid results in a first filtered pixel grid, the second pixel grid results in a second filtered pixel grid, and the work-piece pixel grid results in a filtered work-piece pixel grid.

11. The computer program product of claim 10, wherein the program instruction to match the image of the work-piece to the first image of the training work-piece further comprising:

program instructions to determine if the first pixel grid is the same as the work-piece pixel grid; and program instructions to determine if the first filtered pixel grid is the same as the filtered work-piece pixel grid, in response to a determination that the first pixel grid is not the same as the work-piece pixel grid.

12. The computer program product of claim 9, wherein enhancing the image of the work-piece using the second image of the training work-piece linked to the first image of the training work-piece includes replacing the work-piece pixel grid with the second pixel grid.

13. The computer program product of claim 8, wherein the non-destructive imaging process is a computer tomography (CT) imaging process and the destructive imaging process includes an optical imaging process.

14. The computer program product of claim 8, wherein the first image of the training work-piece has a lower resolution than the second image of the training work-piece.

15. A computer system for detecting work-piece defects, the computer system comprising:

one or more computer processors;

one or more computer-readable storage media;

program instructions stored on the computer-readable storage media for execution by at least one of the one or more processors, the program instructions comprising:

program instructions to receive a first image of a training work-piece captured using a non-destructive imaging process;

program instructions to receive a second image of the training work-piece captured using a destructive imaging process, wherein the second image of the training work-piece covers at least one area in common with the first image of the training work-piece, and the second image of the training work-piece is linked to the first image of the training work-piece by a training model application;

program instructions to receive an image of a work-piece captured using a non-destructive imaging process, wherein the work-piece is substantially similar to the training work-piece, and the non-destructive imaging process used to capture the work-piece is substantially similar to the non-destructive imaging process used to capture the training work-piece;

program instructions to match the image of the work-piece to the first image of the training work-piece; and program instructions to enhance the image of the work-piece using the second image of the training work-piece linked to the first image of the training work-piece, in response to the image of the work-piece matching the first image of the training work-piece.

16. The computer system of claim 15, wherein the first image of the training work-piece has a first pixel grid, the second image of the training work-piece has a second pixel grid, and the image of the work-piece has a work-piece pixel grid, and wherein the second pixel grid covers the same area of the training work-piece as the first pixel grid.

17. The computer system of claim 16, further comprising:
program instructions to filter the first pixel grid, the second pixel grid, and the work-piece pixel grid using the same filter, wherein the first pixel grid results in a first filtered pixel grid, the second pixel grid results in a second filtered pixel grid, and the work-piece pixel grid results in a filtered work-piece pixel grid.

18. The computer system of claim 17, wherein the program instruction to match the image of the work-piece to the first image of the training work-piece further comprising:
program instructions to determine if the first pixel grid is the same as the work-piece pixel grid; and
program instructions to determine if the first filtered pixel grid is the same as the filtered work-piece pixel grid, in response to a determination that the first pixel grid is not the same as the work-piece pixel grid.

19. The computer system of claim 16, wherein enhancing the image of the work-piece using the second image of the training work-piece linked to the first image of the training work-piece includes replacing the work-piece pixel grid with the second pixel grid.

20. The computer system of claim 15, wherein the non-destructive imaging process is a computer tomography (CT) imaging process and the destructive imaging process includes an optical imaging process.

* * * * *